United States Patent [19]
Smith et al.

[11] Patent Number: 5,479,291
[45] Date of Patent: Dec. 26, 1995

[54] NON-LINEAR OPTICAL INTERFEROMETER WITH SATURATED AMPLIFIER

[75] Inventors: Kevin Smith; Elaine J. Greer, both of Suffolk, England

[73] Assignee: British Telecommunications plc, London, England

[21] Appl. No.: 199,299

[22] PCT Filed: Aug. 28, 1992

[86] PCT No.: PCT/GB92/01579

§ 371 Date: Apr. 8, 1994

§ 102(e) Date: Apr. 8, 1994

[87] PCT Pub. No.: WO93/05596

PCT Pub. Date: Mar. 18, 1993

[30] Foreign Application Priority Data

Sep. 3, 1991 [GB] United Kingdom .................. 9118843

[51] Int. Cl.$^6$ .............................. G02F 1/35; H04B 10/16
[52] U.S. Cl. ......................... 359/333; 359/176; 359/139; 385/31
[58] Field of Search ..................................... 359/344, 174, 359/176, 139, 333, 158; 375/4; 385/31

[56] References Cited

U.S. PATENT DOCUMENTS

5,309,267 5/1994 Huang ........................................ 359/139
5,369,520 11/1994 Avramopoulos et al. .............. 359/176

OTHER PUBLICATIONS

Smith et al., "Pulse Amplification and Shaping Using a Nonlinear Loop Mirror that Incorporates a Saturable Gain", a reprint from Optics Letters, pp. 408–410.

smith et al., "Square Pulse Amplification Using Nonlinear Loop Mirror Incorporating Saturable Gain", Electronics Letters, 24th Oct. 1991, vol. 27, pp. 2046–2047.

Jinno et al., "Demonstration of Laser–Diode–Pumped Ultrafast All–optical Switching in a Nonlinear Sagnac Interferometer", Electronics Letters, vol. 27, No. 1, 3 Jan. 1991, Stevenage, GB, pp. 75–76.

Yamada et al., "Automatic Intensity Control of an Optical Transmission Line Using Enhanced Gain Saturation in Cascaded Optical Amplifiers", IEEE Journal of Quantum Electronics, vol. 27, No. 1, Jan. 1991, New York, US, pp. 146–151.

Fermann et al., "Nonlinear Amplifying Loop Mirror", Optics Letters, vol. 15, No. 13, Jul. 1, 1990, pp. 752–754.

Betts et al., "All–Optical Pulse Compression Using Amplifying Sagnac Loop", Electronics Letters, vol. 27, No. 10, 9 May 1991, Stevenage GB, pp. 858–860.

Betts et al., "All–Optical Pulse Compression Using Amplifying Sagnac Loop", Electronics Letters, vol. 27, No. 10, 9 May 1991, Stevenage GB, pp. 858–860.

Richardson et al., "Very Low Threshold Sagnac Switch Incorporating an Erbium Doped Fibre Amplifier", Electronics Letters, vol. 26, No. 21, 11 Oct. 1990, Stevenage GB, pp. 1779–1781.

Fermann et al., "Nonlinear Amplifying Loop Mirror", Optics Letters, vol. 15, No. 13, 1 Jul. 1990, New York, US, pp. 752–754.

(List continued on next page.)

Primary Examiner—Mark Hellner
Attorney, Agent, or Firm—Nixon & Vanderhye

[57] ABSTRACT

An optical transmission system including an interferometer and a source of optical signals. The interferometer comprises a four-pod optical coupler having first and second input ports and first and second output pods, a silica optical fiber coupling the first and second output pods which exhibits the Kerr optical non-linearity, and an erbium fiber optical amplifier situated asymmetrically between the output ports. The source of optical signals is coupled to the first input port of the interferometer. The system is operated in a regime in which the optical signals saturate the amplifier thereby suppressing any oscillatory output, and their power is sufficient to switch an input signal coupled to the first input pod to the second input pod. This provides pulse shaping and amplification characteristics which are relatively insensitive to the input power of the optical signals from the optical source.

13 Claims, 5 Drawing Sheets

OTHER PUBLICATIONS

Jinno et al., "Demonstration of Laser–Diode–Pumped Ultrafast All–Optical Switching in a Nonlinear Sagnac Interferometer", *Electronics Letters*, vol. 27, No. 1, 3 Jan. 1991, Stevenage GB, pp. 75–76.

Yamada et al., "Automatic Intensity Control of an Optical Transmission Line Using Enhanced Gain Saturation in Cascaded Optical Amplifiers", *IEEE Journal of Quantum Electronics*, 27 Jan. 1991, No. 1, New York, US, pp. 146–151.

INPUT PULSE

OUTPUT PULSE

NON-LINEAR OPTICAL INTERFEROMETER WITH SATURATED AMPLIFIER

This invention relates to an optical transmission system.

BACKGROUND OF THE INVENTION

A known optical transmission system includes an interferometer and a source of optical signals. The interferometer comprises a four port optical coupler having first and second input ports and first and second output ports, an optical coupling means coupling the first and second output ports and including an optical non-linearity, and an optical amplifier. The source of optical signals is coupled to the first input port of the interferometer.

An optical input signal coupled to an input port of such an interferometer is split into two portions by the optical coupler, which portions counter-propagate round the coupling means, for example an optical fibre loop, to return to, and recombine at, the coupler. For a symmetric coupler, the optical path along the coupling means is the same for the two portions. So, for a 50:50 coupler and a symmetrically positioned amplifier, the portions recombine such that the input signal emerges from the port to which it was originally input. The input signal is said to be "reflected" by the interferometer. For this reason, this configuration is often described as a loop mirror, the "loop" being the optical coupling means.

The specification of our co-pending International patent application, publication number WO 88/02875, describes an interferometer having a non-linear optical coupling means, namely a silica optical fibre loop, in which the symmetry of the two counter-propagating directions along the coupling means is broken to provide a differential non-linear effect (and so is called a non-linear optical loop mirror or NOLM). This can be achieved in various ways. For example, a non-50:50 coupler can be used. In this case, the intensities of the signal portions coupled into the ends of the waveguide loop are not equal. When the input signal is of sufficient intensity, the signal portions propagating in opposite directions around the waveguide experience different refractive indices. This results in the two counter-propagating signal portions experiencing different phase shifts, so that, when the signals return to the coupling means, they have an intensity-dependent relative phase shift. The intensity dependence of the relative phase shift results in a device whose output at an input port is, as is well known, an oscillatory function of the intensity of the input signal. Any signal exiting the second input port (that is to say the port to which the input signal is not coupled) is said to be "transmitted" by the interferometer.

A further way of breaking the symmetry of a NOLM is discussed in an article entitled "Nonlinear Amplifying Loop Mirror", by N. E. Fermann, F. Haberl, M. Hoffer, and H. Hochreiter, Opt. Lett., 15, p. 752, (1990), in which an amplifier is placed asymmetrically within the non-linear loop close to one of the output porks of the optical coupler, which in this case is a 50:50 coupler. Such an arrangement improves the performance of the conventional NOLM, in particular by better exploitation of the waveguide loop non-linearity, as it can be accessed by a smaller input signal. The experiments described in the Fermann et al article were carried out at low signal powers, and at repetition rates which did not saturate the gain of the amplifier. It was there noted, however, that amplifier saturation leads to a reduction in the overall gain of the device although, owing to the low pulse fluences, amplifier saturation in each individual pulse could still be neglected. Such a device is called a non-linear amplifying loop mirror (NALM).

Such NOLMs and NALMs can provide pulse shaping in optical transmission systems, and in particular provide pedestal suppression. Thus, these devices have the potential for the suppression of inter-pulse radiation, and for filtering bits in long-distance, all-optical communications systems. Such applications are discussed in an article entitled "Pulse Shaping, Compression, and Pedestal Suppression employing a Non-Linear Optical Loop Mirror" by K. Smith, N. J. Doran, and P. G. J. Wigley, Opt. Lett., 15, p. 1294 (1990).

A NALM could provide amplification in addition to such pulse shaping in an all-optical communications system. However, if the NALM has an oscillatory output, the intensity of the input signal must be relatively constant in order to avoid reflection by the loop mirror.

One way of removing the oscillatory output of a NALM is disclosed in an article titled "All-Optical Pulse Compression Using Amplifying Sagnac Loop" by R. A. Betts, S. J. Frisken, C. A. Telford and P. S. Atherton in Electronics Letters Vol 27 No. 10 (May 9, 1991). In their apparatus, the non-linear element in the loop is a semiconductor laser amplifier (SLA). This provides a saturating non-linearity which suppresses the oscillatory behaviour to provide a linear but rising response. A NALM which provides an approximately constant output would be more attractive for use in optical communications systems.

BRIEF DESCRIPTION OF THE INVENTION

The present invention provides an optical transmission system comprising an interferometer and a source of optical signals, the interferometer comprising a four-port optical coupler having first and second input ports and first and second output ports, an optical coupling means coupling the first and second output ports and including an optical non-linearity, and an optical amplifier, the source of optical signals being coupled to the first input port of the interferometer, wherein the system is such that the optical signals saturate the amplifier thereby suppressing any oscillatory output, and such that the power of the optical signals is sufficient to switch an input signal coupled to the first input port to the second input port.

This optical transmission system achieves an approximately constant output over a range of intensities of input signal, so that a range of intensities of input optical pulse will all be switched to the output of the interferometer. Moreover, the signals will be amplified to an approximately constant intensity. The optical transmission system, therefore, provides amplification of the signal, as well as pulse shaping and noise filtering as described in the article by Smith et al. This is of particular application to optical communications systems.

The optical source may be a pulsed laser, in which case the optical transmission system of the present invention provides, at the second input port, noise-filtered optical pulses of substantially constant peak power, even for what may be variable peak power input pulses. The system of the invention could, therefore, be used as a repeater in a long distance optical communications link, for example a submarine link.

The optical amplifier may comprise part of the coupling means, as described with reference to the NALMs referred to above, or may be coupled to the first input port to amplify the input signals prior to their being switched. In this latter case, the interferometer will require the symmetry to be broken by, for example, a non-50:50 coupler as the amplifier no longer forms part of the coupling means. The interferometer may include an optical fibre loop, although other forms of waveguide may be used, for example, a waveguide formed in a planar substrate such as lithium niobate.

In the case of an optical fibre interferometer, the optical amplifier is conveniently an optical fibre amplifier spliced to the fibre forming the loop. Alternatively, a semiconductor laser amplifier may be employed.

The optical fibre of the loop may be made of material exhibiting the desired non-linearity, or a separate non-linear element may be included in the loop. For example, a highly non-linear element may be incorporated to shorten the loop length, for example a semiconductor laser amplifier.

The invention also provides a method of using an interferometer which comprises a four-port optical coupler having first and second input ports and first and second output ports, an optical coupling means coupling the first and second output ports and including an optical non-linearity, and an optical amplifier, the method comprising coupling a source of optical signals to the first input port of the interferometer in such a manner that the optical signals saturate the amplifier thereby suppressing any oscillatory output, and such that the power of the optical signals is sufficient to switch an input signal coupled to the first input port to the second input port.

DESCRIPTION OF THE DRAWINGS

Embodiments of the present invention will now be described, by way of example, with reference to the accompanying drawings, of which.

DESCRIPTION OF EXEMPLARY EMBODIMENTS

Figure 1:
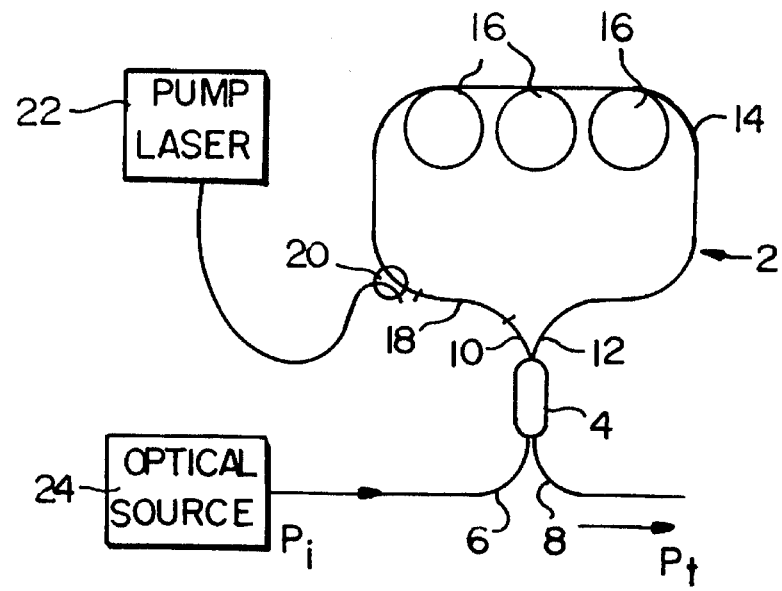
FIG. 1 is a schematic representation of a non-linear optical loop mirror including an optical amplifier asymmetrically positioned within the waveguide loop.

Referring to the drawings, FIG. 1 shows an optical transmission system formed from a Sagnac loop interferometer 2 which comprises a four-port, fused-fibre optical coupler 4 having first and second input ports 6 and 8, and first and second output ports 10 and 12. The output ports 10 and 12 are optically coupled by an optical fibre loop 14. The interferometer 2 is conveniently formed from a single optical fibre 14, two portions of which are fused to form the coupler 4. In this embodiment, the loop 14 comprises an 8.8 km length of dispersion-shifted fibre with a dispersion zero around 1.55 μm obtained from Corning Corporation. The nature of this fibre ensures that pulse shaping due to propagation effects is negligible. Fibre polarisation controllers 16 are also included in the loop 14 to adjust the device to reflection mode at low powers.

A 30 m long erbium doped fibre amplifier (EDFA) 18 is spliced to the output port 10 of the fibre coupler 4. An optical fibre coupler 20 is used to couple pump radiation for the EDFA 18 from a high-power MQW semiconductor laser 22 with a maximum pump power of the order of 50 mW at 1.48 μm. Under these conditions, the EDFA 18 has a small signal gain of 28 dB, and a time-average saturation power of 24 μW. For the above loop parameters, and an effective loop length of 7 km, the saturation power of the amplifier is of the order of 0.6 mW.

An optical source 24 (an actively mode-locked semiconductor laser providing pulses at 1.545 μm of about 12 ps duration at a repetition rate of 2.5 GHz and a mean power of about 50 μW) is connected to the input port 6. The measured time-bandwidth products of the pulses produced by the laser 24 are at best 0.4.

It can be easily shown that, for the configuration of FIG. 1, the square pulse transmissivity, T, is given by $$T = P_t/P_i = G\{1 - 2\alpha(1-\alpha)[1 + cos[(1-\alpha)G - \alpha\phi]]\} \tag{1}$$

where $\phi(=2\pi n_2 P_i L/\lambda A_{\text{eff}})$ is the non-linear phase shift, $P_t$ and $P_i$ are the transmitted and input powers respectively, $\alpha$ is the power coupling coefficient of the coupler, L is the loop length, $\lambda$ is the wavelength, $n_2$ is the non-linear (Kerr) coefficient ($=3.2\times10^{-20}$ m$^2$/W), $A_{\text{eff}}$ is the effective fibre core area, and G is the power gain ($P_{out}/P_{in}$) of the amplifier. The switching power of the device, $P_{Sa}$, ($=\lambda A_{\text{eff}}/2n_2[(1-\alpha)G-\alpha]$) is derived by setting the argument of the cosine function to $\pi$. The use of the amplifier 18 to break the loop symmetry provides low switching powers, together with absolute pedestal suppression for $\alpha=0.5$. As an example, for $G_{SS}=30$ dB, $\alpha=0.5$ and $L=10$ km, $P_{Sa}$ is of the order of 0.25 mW ($A_{\text{eff}}=50$ μm$^2$, $\lambda=155$ μm).

Figure 5:
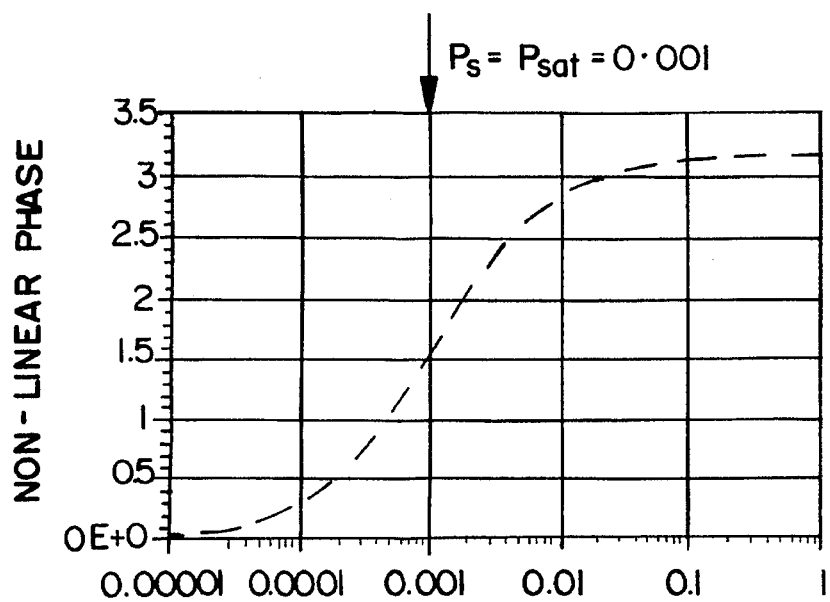
FIG. 5 is a graph of the non-linear phase of the embodiment of FIG. 1 as a function of input peak power.

Considering now the effect of gain saturation of the configuration shown in FIG. 1, and assuming a gain of the form $1 + G_{SS}/(1 + P/P_{sat})$ where $G_{SS}$ is the small signal gain and $P_{sat}$ is the input power at which the gain is compressed by 3 dB. This simple equation describes well all the measured EDFA characteristics for low to medium powers (<1 mW average), and also remains physically accurate in the highly-saturated regime. The influence of the gain saturation is best described with reference to FIG. 5, where the argument of the cosine function in equation (1), that is to say the non-linear phase difference between the counter-propagating waves, is plotted against $P_i$, for $G_{SS}=30$ dB, $P_{sat}=0.001$ (= $P_{Sa}$), $\alpha=0.5$ and $n_2 L/\lambda A_{\text{eff}}=1$.

At high input powers, the non-linear phase difference becomes clamped $\pi G_{SS}P_{sat}$, which can also be expressed as $\pi P_{sat}/P_{Sa}$ since $P_{Sa}$ is approximately equal to $1/G_{SS}$ for large $G_{SS}$. Therefore, by choosing $P_{sat}=P_{Sa}$ we limit the maximum non-linear phase difference to $\pi$.

Figure 6:
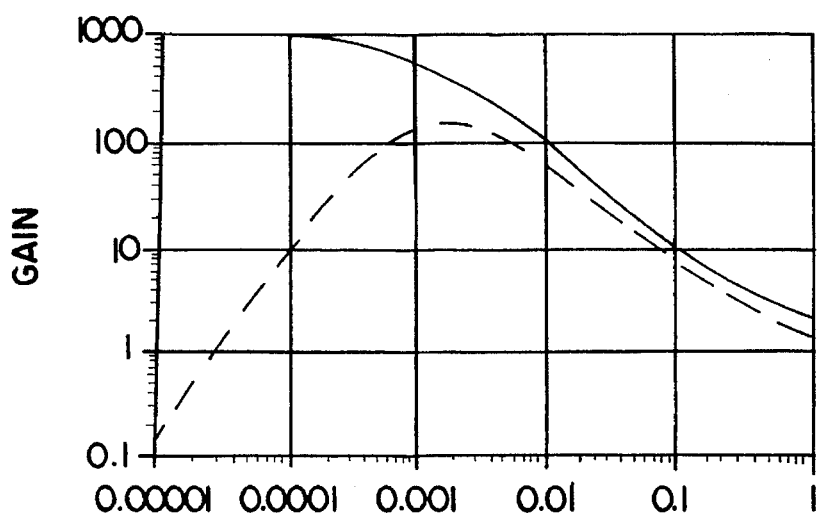
FIG. 6 is a graph showing the gain of the embodiment of FIG. 1 as a function of input peak power compared to the gain provided by the amplifier of the embodiment of FIG. 1 alone.

The evolution of the non-linear phase is apparent in FIG. 6, which shows the computed gain characteristics for sech$^2$ intensity profile pulses (dashed curve). For comparison, the fibre amplifier gain characteristics are also shown for the same values of $G_{SS}$ and $P_{sat}$ (full curve). At low input powers, the device is in reflecting mode, and hence the small signal gain is well suppressed. As the input power is increased, however, the device approaches a transmitting state, and the efficiency closely follows that of the EDFA 18 for $P_i > P_{Sa}$. It is expected that the varying response of the loop throughout the pulse gives rise to incomplete switching and pulse shaping. Although this is largely responsible for the small (2–3 dB) reduction in efficiency relative to the EDFA 18 at high powers, the loop amplifier benefits from pulse compression and low-level light suppression.

Figure 7:
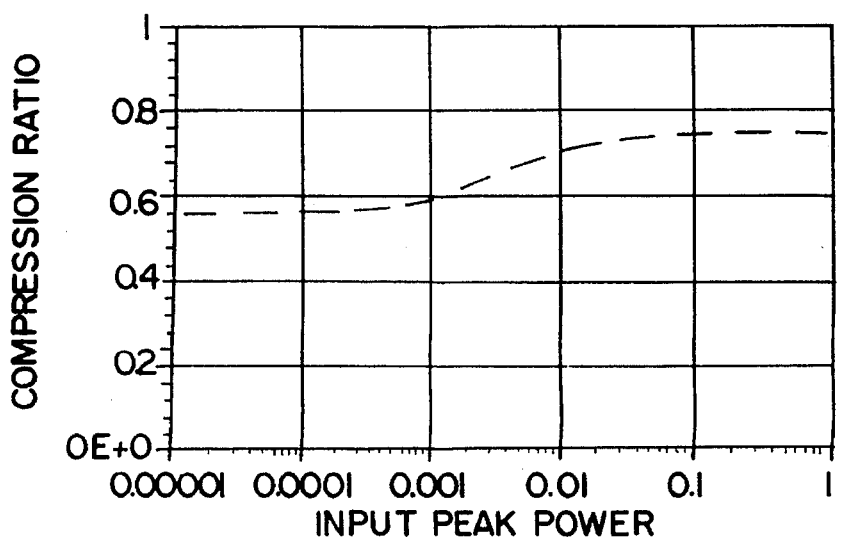
FIG. 7 is a graph showing the compression ratio provided by the embodiment of FIG. 2.

In addition, since amplifier saturation gives rise to a non-linear phase difference which, over the power range of interest, is relatively constant, the pulse shaping characteristics are fairly insensitive to the input level. This is one of the key aspects of the present invention, and is illustrated in FIG. 7, where the compression ratio ($\tau_{out}/\tau_{in}$) is shown to vary only from 0.55 to 0.75 over five decades of input power. This is in stark contrast to the complex pulse shaping previously observed for loop mirror configurations, where the input power can cycle through the sinusoidal output of such prior art NOLMs. Although not obvious for the range of input power in FIG. 7, $\tau_{out}/\tau_{in}$ tends to unity for low power (linear) operation.

Figure 9:
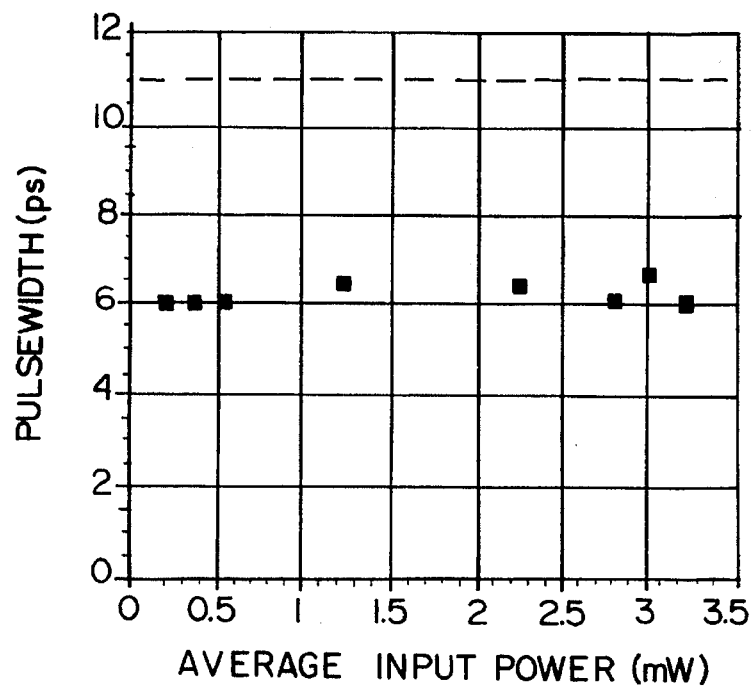
FIG. 9 is a graph showing the auto-correlation width compression ratio as a function of input power.

Pulse durations are inferred from the second harmonic auto-correlation measurements. The auto-correlation shape of the transmitted pulses does not change significantly as a function of the input power, this being clearly illustrated in FIG. 9, where the ratio of the input and output correlation widths is plotted against the input power for average powers up to 3.5 mW (120 mW peak). It should be noted that the ratio of about 0.55 varies by less than 20% over a range of power of the order of 200×$P_{Sa}$. The device gain follows the trend described in FIG. 6, with a maximum of 17 dB occurring at an average input power of 50 µW (1.6 mW peak). The performance is well in keeping with that indicated by FIG. 6, bearing in mind a 3 dB loss associated with the loop fibre 14 and a lower (28 dB) EDFA gain. It should also be noted that the measured time-bandwidth products of the filtered pulses are essentially the same as the input.

Figure 8A:
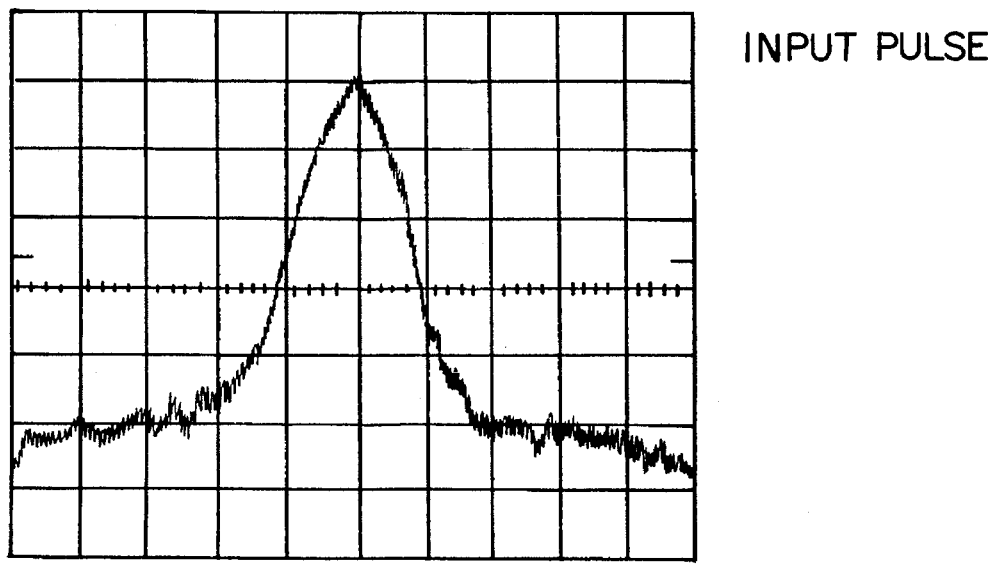
FIGS. 8a and 8b are reproductions of an oscillogram showing the auto-correlation traces of input pulses with substantial inter-pulse radiation and pedestal free, compressed pulses amplified by the embodiment of FIG. 1, respectively.
Figure 8B:
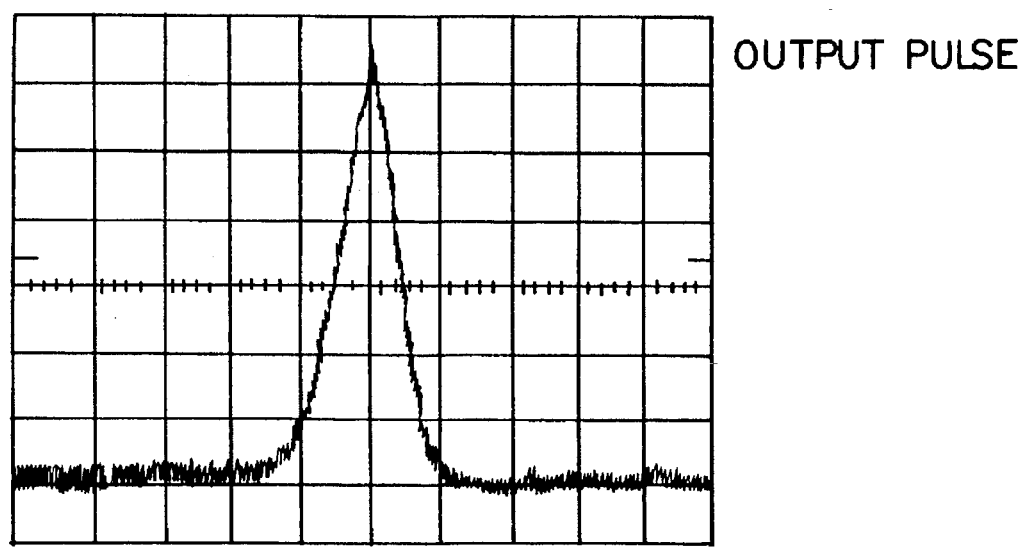

A further clear demonstration of the intensity filtering properties is shown in FIGS. 8a and 8b. Here, the amplified, shortened (to 6 ps) and pedestal-free output (FIG. 8b) is shown for input pulses with substantial interpulse radiation (FIG. 8a). This behaviour is observed over the total range of input power.

Figure 2:
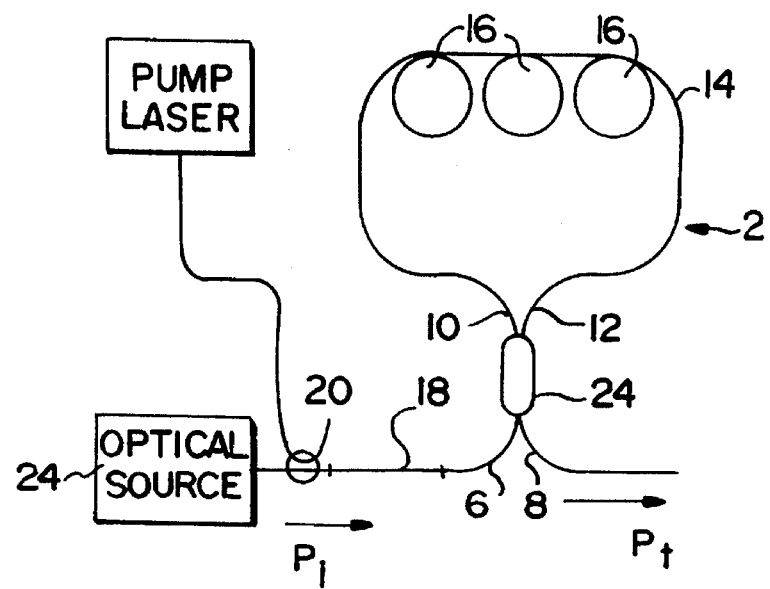
FIG. 2 is a schematic representation of a non-linear optical loop mirror having an amplifier coupled to an input port.

A further embodiment of the present invention is shown in FIG. 2, in which the erbium amplifier 18 of FIG. 1 is now coupled to the input port 6 of the interferometer 2. Like elements are given the same reference numerals as in FIG. 1.

In this case, the symmetry of the NOLM is broken by use of a non-symmetric coupler 24 in place of the symmetric 50:50 coupler 4 of FIG. 1, and the switching power $P_{Sb}$ is that of the standard loop mirror (= $P_{Sa}$ with G=1) divided by the gain of the amplifier 18. The ratio of the switching powers of the devices of FIG. 1 and FIG. 2 is, therefore, given by $$P_{Sb}/P_{Sa} = [(1-\alpha)G-\alpha]/[(1-2\alpha)G] \quad (2)$$

One can see that, for large G (which is generally true), equation (2) simplifies to $P_{Sb}/P_{Sa} = (1-\alpha)/(1-2\alpha)$. For a value of $\alpha=0.4$, the switching power advantage of the device of FIG. 1 is at most a factor of 3. However, the real benefit of the device of FIG. 1 is realised as $\alpha$ approaches 0.5, in this case, since the fibre amplifier 18 breaks the loop symmetry, low switching powers are maintained, together with absolute pedestal suppression for $\alpha=0.5$. As an example, for $G_{SS}=30$ dB, $\alpha=0.5$ and L=10 km, $P_{Sa}$ is of the order of 0.25 mW ($A_{eff}=50$ µm$^2$, $\lambda=1.55$ µm). For the device of FIG. 2, however, as $\alpha$ approaches 0.5 the switching power rapidly goes to infinity.

Figure 3:
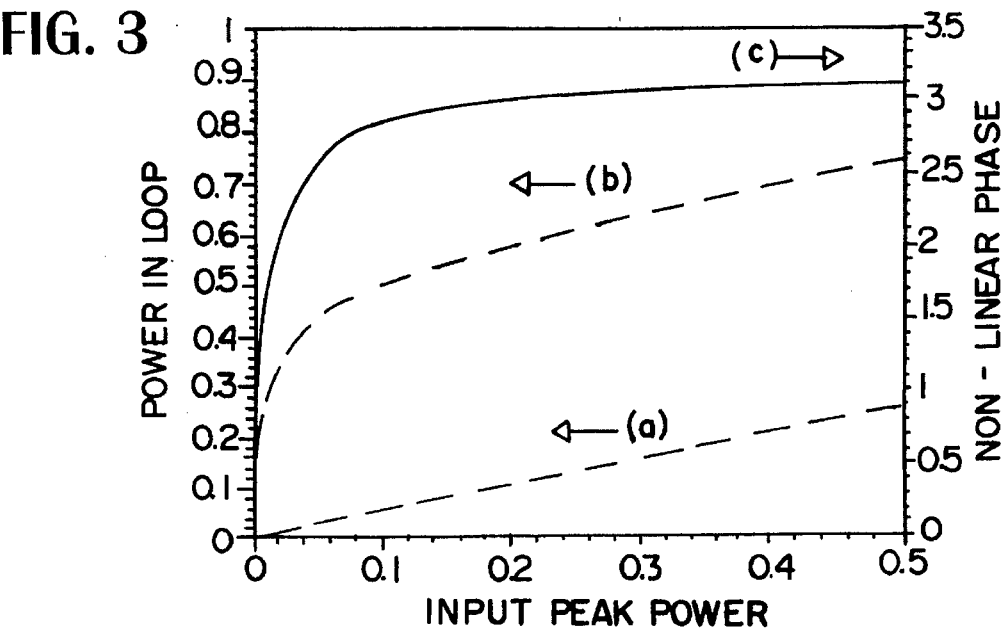
FIG. 3 is a graph showing the power circulating in the loop for the non-linear optical mirror shown in FIG. 1, and the resultant non-linear phase difference produced by various input peak powers.

Referring now to FIG. 3, there is shown the power circulating in the two counter-propagating directions as a function of input peak power for the embodiment of FIG. 1, where (a) is the power circulating anti-clockwise between the port 12 and the input of the erbium amplifier 18, and (b) is the power circulating in the loop in a clockwise direction from the erbium amplifier to the output port 12. The solid curve (c) of the graph of FIG. 3 shows the non-linear phase shift of the pulses circulating in the two directions round the loop as a function of input peak power; and, as can be clearly seen, the non-linear phase shift becomes substantially constant at higher peak powers.

Figure 4:
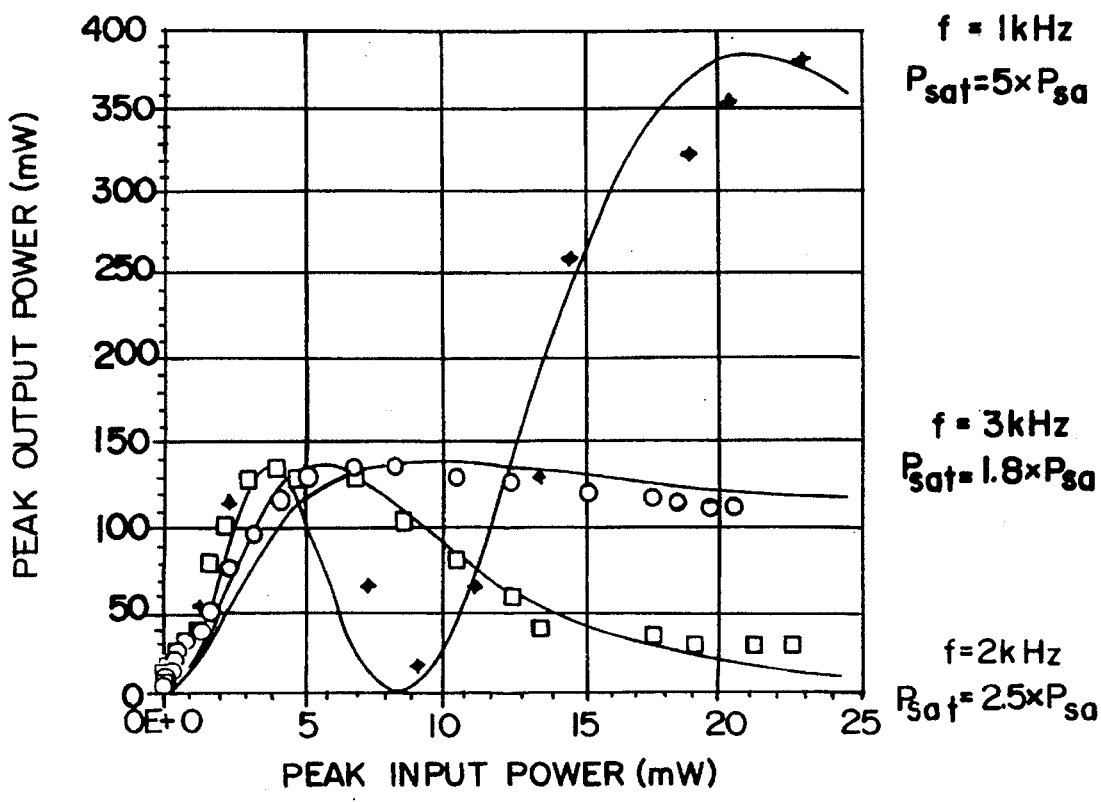
FIG. 4 is a graph showing the peak output power from the embodiment of FIG. 1 as a function of peak input power for three pulse repetition rates.

Referring now to FIG. 4, there is shown a graph of the peak output power from the port 8 as a function of peak input power (in mW) of an optical signal input at the input port 6 at three different pulse repetition rates f equal to 1, 2 and 3 kHz. In this case, for f equal to 1 kHz, $P_{sat}$ equals five times the switching power, $P_{Sa}$, of the interferometer of FIG. 1. It can be seen that the output power is an oscillatory function of the input power. As the saturation power moves closer to the switching power with increasing frequency, the peak output power becomes more nearly a constant for peak input powers corresponding to $P_{Sa}$. It can be seen then that, if the interferometer 2 is operated in an optical transmission system such that amplifier saturation occurs at approximately the power necessary to switch the input power to the second input port 8 at the first switching peak, then approximately constant output power is achieved above the switching power. This provides pulse shaping and amplification characteristics which are relatively insensitive to the input power of the optical signals from the optical source.

Figure 10:
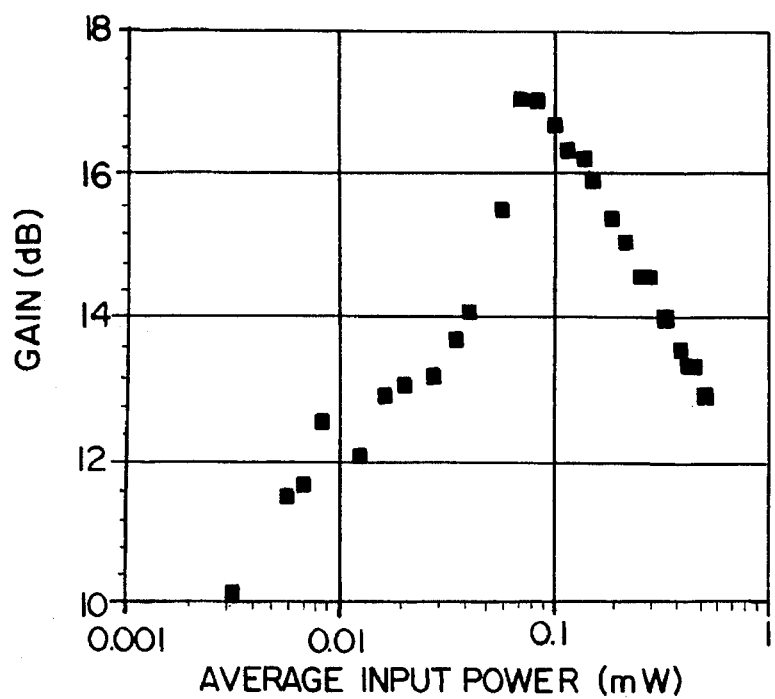
FIG. 10 is a graph showing the gain verses average input power of the embodiment of FIG. 1.

Referring now to FIG. 10 there is shown a graph of the gain of the embodiment of FIG. 1 as a function of the average input power of the optical signals from the optical source 24.

We claim:

1. An optical transmission system comprising an interferometer and a source of optical signals, the interferometer comprising a four-port optical coupler having first and second input pods and first and second output pods, an optical coupling means coupling the first and second output pods and including an optical non-linearity, and an optical fibre amplifier, the source of optical signals being coupled to the first input pod of the interferometer, wherein the system is such that the optical signals saturate the optical fibre amplifier thereby suppressing any oscillatory output, and such that amplifier saturation occurs at approximately the power of the optical signals that is sufficient to switch an input signal coupled to the first input pod to the second input pod.

2. A system as claimed in claim 1, wherein the optical source is a pulsed laser.

3. A system as claimed in claim 2, wherein the system is such as to provide at the second input port, noise-filtered optical pulses of substantially constant peak power.

4. A system as claimed in claim 1, wherein the optical amplifier constitutes part of the coupling means.

5. A system as claimed in claim 1, wherein the optical amplifier is coupled to the first input port upstream of the output ports, thereby to amplify the input signals prior to their being switched.

6. A system as claimed in claim 5, wherein the optical coupler is a non-50:50 coupler.

7. A system as claimed in claim 1, wherein the interferometer includes an optical fibre loop.

8. A system as claimed in claim 7, wherein the optical fibre amplifier is spliced to the fibre forming the loop.

9. A system as claimed in claim 7, wherein the optical fibre is made of a material exhibiting the desired non-linearity.

10. A system as claimed in claim 7, wherein a separate non-linear element is included in the optical fibre loop.

11. A system as claimed in claim 10, wherein the separate non-linear element comprises a semiconductor laser amplifier.

12. A system as claimed in claim 1, wherein the interferometer is a waveguide formed in a planar substrate such a lithium niobate.

13. A method of using an interferometer which comprises a four-port optical coupler having first and second input pods and first and second output ports, an optical coupling means coupling the first and second output ports and including an optical non-linearity, and an optical fibre amplifier, the method comprising coupling a source of optical signals to the first input pod of the interferometer in such a manner that the optical signals saturate the optical fibre amplifier thereby suppressing any oscillatory output, and such that amplifier saturation occurs at approximately the power of the optical signals that is sufficient to switch an input signal coupled to the first input port to the second input port.

* * * * *